(12) United States Patent
Jessogne

(10) Patent No.: US 11,437,794 B1
(45) Date of Patent: Sep. 6, 2022

(54) DELIVERY DEVICE FOR ROOFTOP EQUIPMENT AND SYSTEMS AND METHOD OF INSTALLATION

(71) Applicant: E & I Sales Co., Tulsa, OK (US)

(72) Inventor: Steven G. Jessogne, Tulsa, OK (US)

(73) Assignee: E & I Sales Co., Tulsa, OK (US)

( * ) Notice: Subject to any disclaimer, the term of this patent is extended or adjusted under 35 U.S.C. 154(b) by 0 days.

(21) Appl. No.: 17/453,554

(22) Filed: Nov. 4, 2021

(51) Int. Cl.
*H02G 3/08* (2006.01)

(52) U.S. Cl.
CPC .................... *H02G 3/08* (2013.01)

(58) Field of Classification Search
CPC .... H02G 3/08; H02G 3/081; H02G 1/00; H02G 3/083; H02G 3/086; H05K 5/00; H05K 5/02; H05K 5/0204; H05K 5/0221; H05K 5/0226; H05K 5/0247; H05K 5/069
USPC ....... 174/50, 480, 481, 53, 57, 58, 520, 535, 174/502, 503; 220/3.2–3.9, 4.02; 248/906; 277/641, 590, 312
See application file for complete search history.

(56) References Cited

U.S. PATENT DOCUMENTS

| | | | |
|---|---|---|---|
| 6,942,189 B2* | 9/2005 | Capozzi | H01Q 1/02 248/122.1 |
| 7,459,630 B2 | 12/2008 | Pedret et al. | |
| 7,493,729 B1 | 2/2009 | Semmes | |
| 13,853 A1 | 2/2012 | Coyle et al. | |
| 8,479,455 B2* | 7/2013 | Schaefer | H02G 3/088 174/564 |
| 9,496,697 B1 | 11/2016 | Wentworth | |
| 9,819,166 B1* | 11/2017 | Capozzi | H02G 3/088 |
| 10,230,227 B1* | 3/2019 | Wade | H02G 3/088 |
| 10,505,354 B2* | 12/2019 | Wade | H02G 3/14 |
| 10,594,121 B2* | 3/2020 | Yang | H02G 3/081 |

(Continued)

FOREIGN PATENT DOCUMENTS

JP 6582016 12/2018

OTHER PUBLICATIONS

Soladeck, Soladeck 0799-5g Roof-Mount Enclosure, URL: https://www.solaris-shop.com/soladeck-0799-5g-roof-mount-enclosure/ (Mar. 29, 2020).

(Continued)

*Primary Examiner* — Angel R Estrada
(74) *Attorney, Agent, or Firm* — Millikin Intellectual Property Law, PLLC

(57) ABSTRACT

Rooftop device for delivering electrical power, plumbing, lines and other systems from the inside of a building to the outside of the building to equipment and systems installed on the rooftop. The device comprises a powder coated white NEMA 4 enclosure to reduce corrosion and minimize the effects of heat buildup in the enclosures during high temperature exposure. A GFCI circuit breaker in the enclosures allows electricians to move electrical power from the closes source, which reduces installation costs. The device comprises MCB or MCP disconnect switches which will provide faster and more precise protection to equipment and the circuits that supply them, and ethernet cable, coaxial cable, conductor thermostat wire. A mounting assembly, comprising a flashing and a cleat, and a vice assembly cooperate to apply pressure from the outside of the rooftop and from the inside of the roof, providing a more secure, dryer fit for roof penetrations.

15 Claims, 9 Drawing Sheets

(56) References Cited

U.S. PATENT DOCUMENTS

2007/0199561 A1     8/2007   Soucy
2020/0119533 A1*   4/2020   Wade ...................... H02G 3/10

OTHER PUBLICATIONS

Qbox Junction Box, Qbox Junction Box for Comp Shingle Roofs, URL: https://www.quickmountpv.com/products/qbox.html?cur=0 (May 1, 2020).

* cited by examiner

DELIVERY DEVICE FOR ROOFTOP EQUIPMENT AND SYSTEMS AND METHOD OF INSTALLATION

TECHNICAL FIELD OF THE INVENTION

The present invention relates generally to devices such as junction boxes for delivering power to electrical equipment and systems. More particularly, but not by way of limitation, the present invention relates to devices for delivering power to electrical equipment and systems installed on a rooftop. Methods of using devices for delivering rooftop power and installing devices for delivering rooftop power also are provided.

SUMMARY OF THE INVENTION

The present invention is directed to a rooftop delivery device for supplying electric power, plumbing and lines to equipment and systems positioned on a roof. The rooftop delivery device comprises a mounting assembly, comprising a flashing positioned above the roof; a cleat positioned below the roof; a vice assembly for clamping the flashing and the cleat against the roof.

The present invention further directed to a method of installing a rooftop delivery device on a roof structure having an exterior surface and an interior surface for the delivery of electric power, plumbing and lines to equipment and systems on the roof. The method comprises the steps of providing a flashing on the exterior surface of the roof structure; providing a cleat beneath the interior surface of the roof structure; moving the cleat toward the interior surface of the roof structure and clamping the flashing against the exterior surface of the roof and the cleat against the interior surface of the roof.

DETAILED DESCRIPTION OF THE INVENTION

Figure 1:
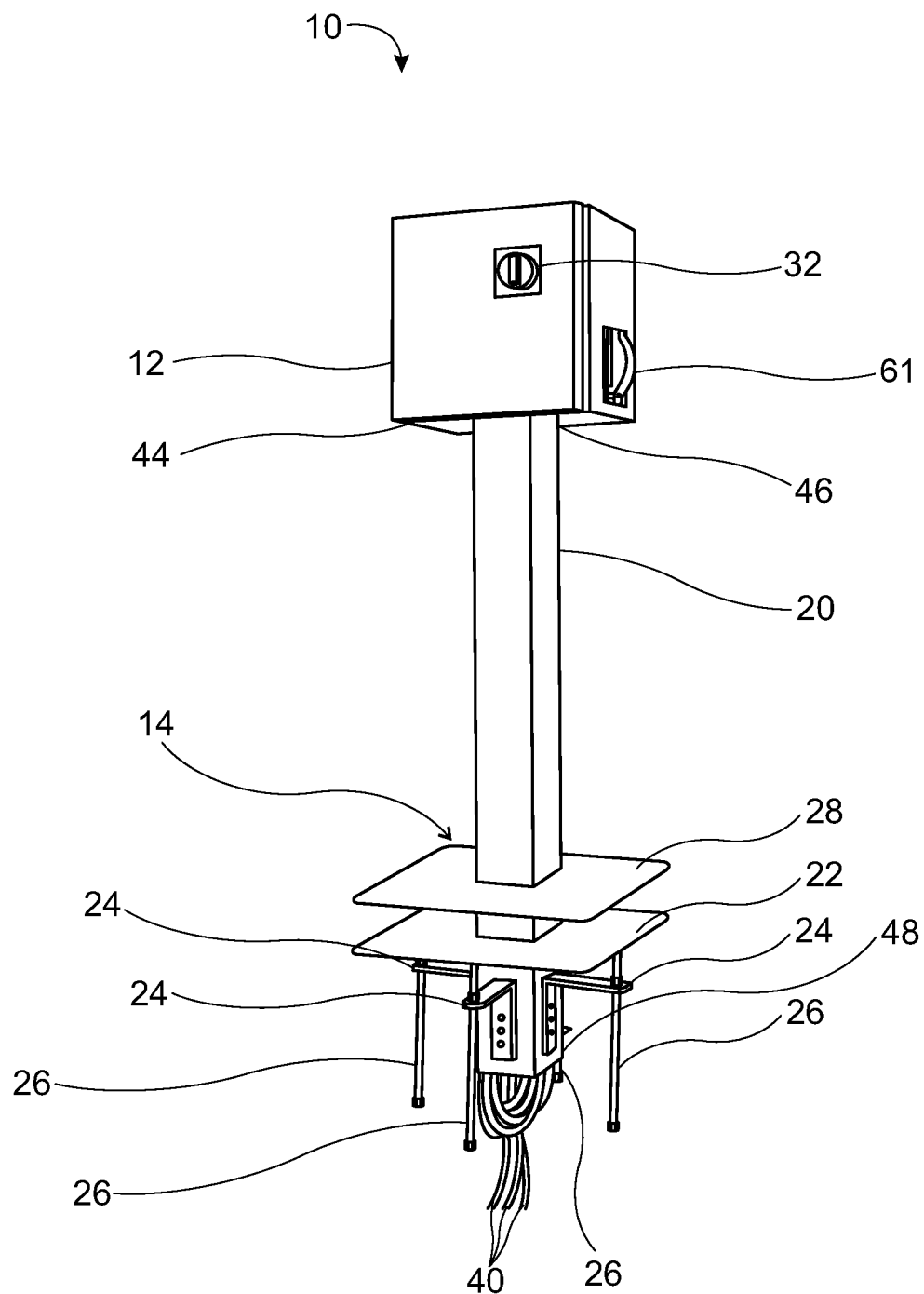
FIG. 1 is a perspective view of an embodiment of an illustrative device for delivering rooftop power, the device constructed in accordance with the present invention.

Building designs frequently evolve with changes in technology and usage requirements for commercial, industrial and residential structures. Rooftops are now more frequently employed by designers, architects and engineers for the purpose of mooring electrical equipment and systems to advance the interests of economy and design.

Building, plumbing and electrical codes consequently are updated to keep pace with the advancements in technology and evolutions in building design, including the provision of service receptacles and equipment disconnects for safety and convenience. For example, the National Electrical Code (NEC) requires a 125-volt, single-phase, 15- or 20-ampere-rated service receptacle located within 25 feet of heating, air-conditioning, or refrigeration equipment, indoor service equipment, and equipment that requires dedicated space from NEC Section 110.26 (E), which includes switchboards, switchgear, panelboards, motor control centers. Ground Fault Circuit Interrupter (GFCI) protection is required for all receptacles specified in Section 210.63 regardless of whether it is outside, including on a rooftop, inside, in an attic or in an electrical equipment room that is considered a dry location. Some codes also require minimum clearances for rooftop electrical terminations and a minimum number of power receptacles to match the type and number of equipment or electrical systems installed on a roof.

In order to supply electrical power to rooftop equipment and systems, conventional roof mounted enclosures for electrical power connections penetrate the roof decking and impair the integrity of the roof, increasing the risk of leaks and necessitating repairs. Roof penetrations also cause construction delays and increase costs. Several conventional raintight enclosures or junction boxes are available. To qualify for use on a rooftop, the junction box must meet National Electrical Manufacturer Association (NEMA) 3 ratings, meaning that the enclosure must be constructed for either indoor or outdoor use to provide a degree of protection to personnel against access to hazardous parts, to provide a degree of protection of the equipment inside the enclosure against ingress of solid foreign objects, such as falling dirt, to provide a degree of protection with respect to harmful effects on the equipment due to the ingress of water, such as rain, sleet and snow, and that will be undamaged by the external formation of ice on the enclosure.

In addition, the junction box or enclosure must be mounted in the correct orientation to minimize risk of leaks and damage. Many conventional enclosures cannot be installed in a downward direction. Conventional devices use gasket sealed plastic boxes placed under the electrical array to provide protection. Lengths of PV wire with MC4 connectors mate with modules, and then run into a junction box to transition to Thermoplastic High Heat-resistant Nylon coated (THHN) wire. Wire nut splices can be used, although junction blocks or water-resistant splices are employed with conventional rooftop devices. Conventional devices require multiple penetrations through the roof to add stability to these devices.

NEC codes require that the wires be labeled on all exposed junction boxes and conduit. If the inverter is a grounded type, grounded wire must be white and ungrounded wire black. Although regulations dictate the color codes for electrical wires, particularly for grounded wires, there is disparity in the use of correctly coded wires. Some electricians use black as the negative wire and red as the positive wire. Red wire fades to white if exposed to sunlight, so some electricians tape the ends of a black wire with red tape. Additionally, lead wires should not use the electrical convention of black and white wires. Code permits gray to substitute for grounded conductors and orange for the ungrounded conductors.

The subject invention addresses these deficiencies and more and is directed to a rooftop power drop device that delivers electric power from the inside of a building to equipment and systems installed on the outside of the building on a rooftop. The device comprises a white, powder coated enclosure, disconnects to provide protection for the circuitry and equipment to which power is delivered, a communications module, a mounting assembly and a vice assembly. The mounting assembly comprises a cleat that allows application of pressure from the outside of the rooftop and from the inside of the roof, providing a more secure and dryer fit. Flashing is welded to the stand that is installed on the rooftop. The stand of the invention goes through the roof through hole sized for the application, depending on the equipment being installed, with a matching cleat installed on the stand from the inside. The subject invention also has applicability for any piping, tubes, lines and other conduits that must pass from the interior of a structure through the roof, such as plumbing lines, freon lines, condensation lines, and the like.

For installation, the device is placed through a perforation created in the roof. From the inside of the roof, the cleat slides onto the bottom of the stand. Traveler screws are threaded through brackets that are inserted in key slots on the stand for ease of installation. The traveler screws are screwed down, which moves the cleat up toward the inside of the roof. When the cleat is pressed firmly against the inside of the roof, the traveler screws apply a downward pressure on the stand, which pulls the flashing firmly against the top of the roof for a sturdier and drier fit. This enables the cleat to grab the roof from the inside and from outside of the building, which gives the device a more stable fit and minimize leaks. These and other advantages of the invention will be described in more detail.

Figure 2:
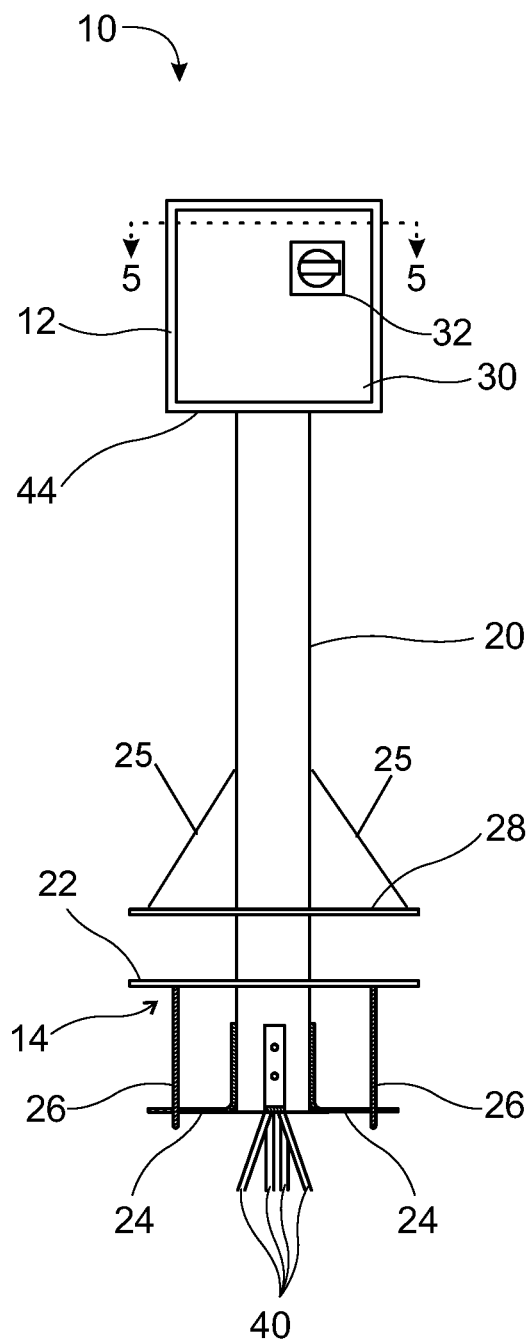
FIG. 2 is a front plan view of the device of FIG. 1, but with the addition of gussets.
Figure 3:
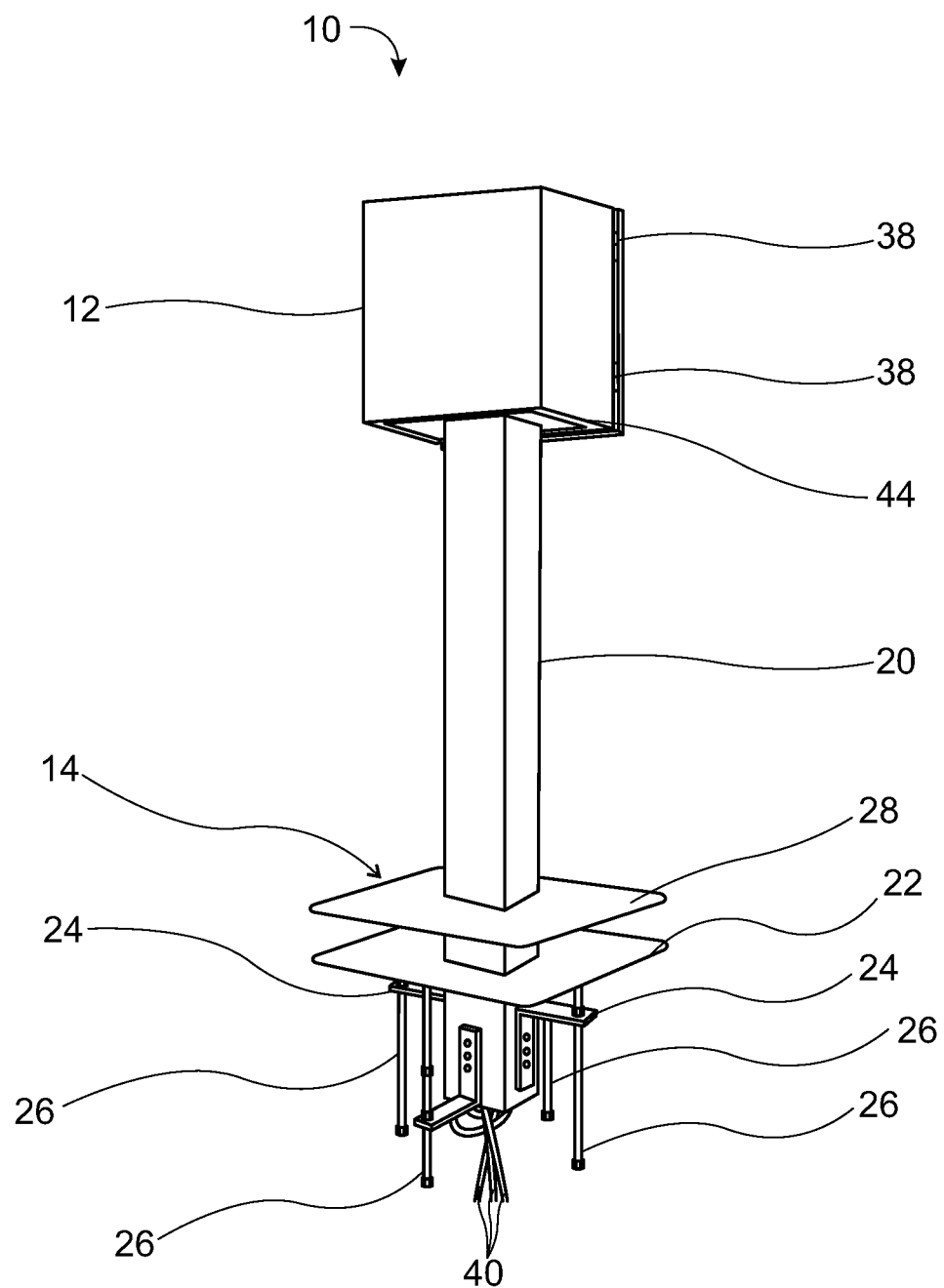
FIG. 3 is a rear perspective view of the device of FIG. 1.

Turning now to the drawings in general, and to FIGS. 1, 2 and 3 in particular, there is shown therein an illustrative rooftop power delivery device 10 constructed in accordance with the present invention. The rooftop power delivery device 10 comprises an enclosure 12 for housing electrical components, which are yet to be described. The device 10 further comprises a mounting assembly 14, and a vice assembly 18. The mounting assembly includes at least one stand 20, at least one cleat 22, and at least one flashing 28. It will be appreciated that the stand 20 may be part of the mounting assembly 14 or may be a component separate from the mounting assembly. The vice assembly 18 comprises one or more brackets 24 and securing means, such as traveler screws 26, for clamping the flashing 28 and the cleat 22 against the roof.

The enclosure 12 houses electrical components and protects them from damage and elements. The enclosure 12 may be comprised of a variety of materials including metals, such as carbon steel, galvanized steel, stainless steel, aluminum, chrome, steel chrome-plated, steel with nickel/silicon carbide composite coating, brass, brass-chrome plated, brass with nickel/silicon carbide composite, stainless steel, stainless chrome-plated, stainless with nickel/silicon carbide composite coating, carbonitrided steel, nickel carbide plated steel, tempered steel, and non-metals, such as polycarbonate or polyvinylchloride. Nonmetals, such as polycarbonate or polyvinylchloride, may be suitable materials for the enclosure 12 in some applications, such as water treatment and marine or marina applications. The enclosure 12 preferably meets NEMA 3, 3R, 3S, 4, 4X, 6, 6P, 12 or 13 standards. In one embodiment of the invention, the enclosure 12 meets or exceeds NEMA 4 ratings.

Figure 4:
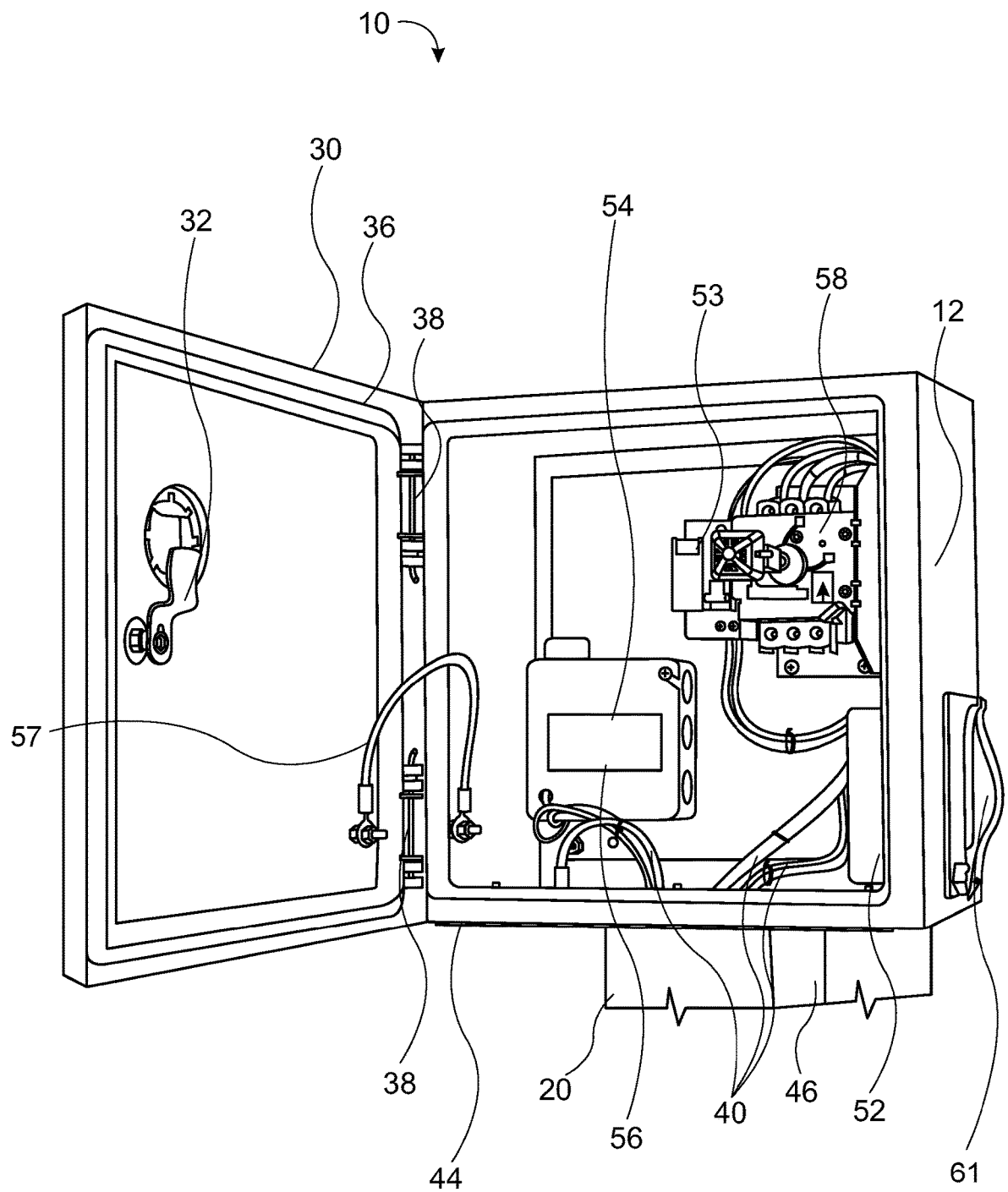
FIG. 4 illustrates an interior view of the components inside the enclosure of the rooftop power delivery device of FIG. 1.

Turning now to FIG. 4, but with continuing reference to FIGS. 1, 2 and 3, the enclosure 12 comprises a door 30 and latch 32 to enable access to the interior electrical components, yet to be described. Many door and window configurations and latch/lock options are available for use with the enclosure 12 of the rooftop power delivery device 10. The door 30 may comprise an outdoor weatherproof cover, including a weatherproof seal 36, and is operatively connected via one or more hinges 38.

The enclosure 12 may be any color, although in one embodiment of the invention, the enclosure is powder coated in the color white to reduce corrosion and minimize effects of heat buildup during high temperature exposure, particularly on a rooftop where heat levels may be excessive. Data gathered from significant testing and monitoring of the effects of direct sunlight on heat buildup inside the enclosure 12 shows that the color white yields significant reduction in resulting temperatures and thermal energy inside the enclosure. Because GFCI receptacles have a suggested operating temperature of approximately 104 degrees Fahrenheit, it is important to maintain recommended operating temperatures within the enclosure 12.

The shape of the enclosure is variable, including cylindrical, spherical, cubed, cuboid, prismatic or pyramidal. In one embodiment of the invention, the shape of enclosure 12 is a cuboid or rectangular prism having one dimension that is longer than the other two dimensions. The dimensions of the enclosure 12 should be sized for the particular application in which the rooftop power delivery device 10 is to be deployed. For example, the enclosure may range in size from about 1.5 inches (42 mm) wide and about 1.5 inches (42 mm) deep and about 2.95 inches (75 mm) high to about 36 inches (91.44 cm) wide and about 36 inches (91.44 cm) deep and about 48 inches (121.92 cm) high. References herein to measurements and diameters are to outside measurements and diameters, unless specifically stated to reference an inner diameter or measurement. Methods known in the art for sizing junction boxed may be used to size the enclosure 12 of the rooftop power delivery device 10.

It will be appreciated that the shape and size of the enclosure 12 may accommodated to the particular application. For example, the size and shape of the enclosure for HVAC and plumbing applications generally may request a larger enclosure than for electrical applications. It will also be appreciated that the rooftop power deliver device may be employed without an enclosure 12 via the use of a gasket, not shown, which directs communication cables, wires, cords and bus bars directly from the stand 20 for connection with rooftop equipment and systems.

The enclosure 12 is in communication with and is supported by the mounting assembly 14, including one or more stands 20, one or more cleats 22, one or more brackets 24, securing means such as traveler screws 26, and one or more flashings 28. The stand 20 extends through and penetrates the roof in a manner yet to be described and supports the enclosure 12 on the rooftop. It will be appreciated that the stand 20 may be part of the mounting assembly 14 or may be a separate component independent from the mounting assembly.

The stand 20 may be any shape, including cylindrical, spherical, cubed, cuboid, prismatic or pyramidal. The shape of the stand 20 may match the shape of the enclosure 12, and while matching the shape of the stand 20 and the enclosure 12 is unnecessary, this may be advantageous for certain applications and space requirements or for conditions at the site.

The stand 20 serves a variety of functions. The stand 20 supports the enclosure 12 directly off the roof, thus mitigating the deleterious effects of heat, humidity, corrosion, water intrusion and other elements and physical threats. The stand 20 also forms an enclosed conduit, or raceway, for the transition of communication cables, wires, cords and bus bars 40 from inside a building or structure to the enclosure 12 of the rooftop power delivery device 10. The cables, wires, cords and bus bars 40 include, without limitation, ethernet cable, coaxial cable, and five conductor thermostat wire.

The stand 20 may be comprised of the same material as the enclosure 12, including metals, such as, carbon steel, galvanized steel, stainless steel, aluminum, chrome, steel chrome-plated, steel with nickel/silicon carbide composite coating, brass, brass-chrome plated, brass with nickel/silicon carbide composite, stainless steel, stainless chrome-plated, stainless with nickel/silicon carbide composite coating, carbonitrided steel, nickel carbide plated steel, tempered steel, and non-metals, such as polycarbonate or polyvinylchloride. The stand also may be comprised of rigid metal conduit, intermediate metal conduit, electro metallic tubing, electric nonmetallic tubing, nonmetallic underground conduit, flexible metallic tubing, or greenfield spiral metal flexible conduit. In one embodiment of the invention, the stand 20 is comprised of carbon steel.

Figure 5:
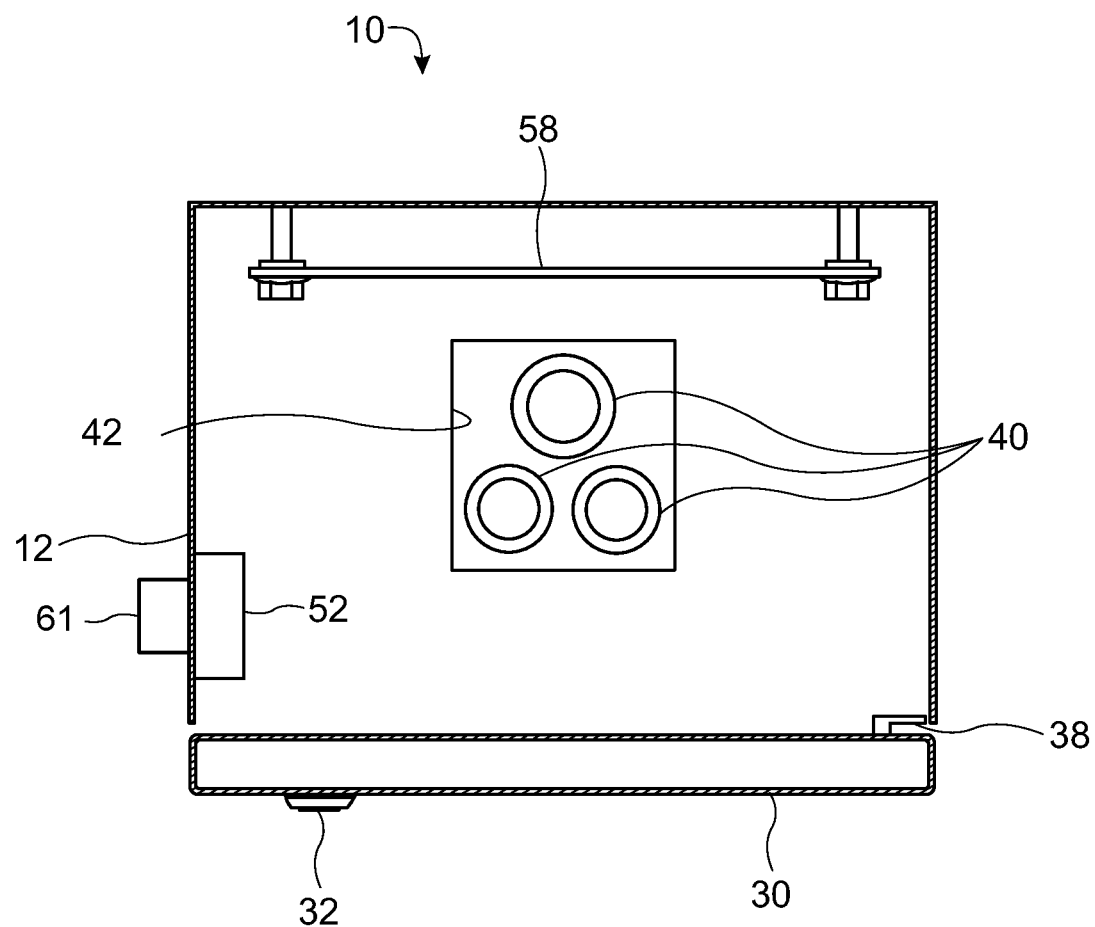
FIG. 5 is a cross-section view taken along line 5-5 of FIG. 2.

Turning now to FIG. 5, but with continuing reference to FIGS. 1, 2, 3 and 4, the enclosure 12 forms an aperture 42 on a bottom side 44 of the enclosure for receiving the stand 20. The stand 20 has an upper end 46 and a lower end 48. The upper end 46 of the stand 20 is connected to the enclosure 12 at or through the aperture 42 in a variety of ways suitable for sealing the communication therebetween and protecting the cables, wires, cords and bus bars 40 and the contents of the enclosure 12 from heat, humidity, corrosion, water intrusion and other elements and physical threats.

It will be appreciated that the rooftop power delivery device 10 may comprise more than one stand 20, providing multiple throughways for the passage of the communication cables, wires cords and bus bars 40. In one embodiment of the invention, only one stand 20 is employed and contains all of the necessary communications cables, wires, cords and bus bars 40 enclosed within one stand to reduce the need for multiple penetrations through the roof, while still providing stability and strength to the device 10.

In one embodiment of the invention, the enclosure 12 and the stand 20 are comprised of carbon steel and are connected with a solid weld around the aperture 42 to create a water tight seal between the stand 12 and the enclosure 20. The welds preferably meet American Welding Society (AWS) Section D (Structural Welding Code—Steel) 1.1 and 1.3. The stand 20 also may be secured to the enclosure 12 via rivets, adhesive, such as epoxies, polyurethane and cyanoacrylate, studs, brazing, soldering, spot welding or nuts and bolts and combinations of the foregoing.

The cables, wires, cords and bus bars 40 deliver electric power to components within the enclosure 12, which now will be described. Protectively housed with the enclosure 12 are one or more GFCI receptacles and/or GFCI circuit breakers 52, one or more ethernet connections 54, one or more thermostats 56, a control panel, and a grounding wire 57. The communications cables 40 thus include ethernet cables, coaxial cables, and thermostat cables for ease of building management systems to communicate with rooftop equipment and dish communication. Accordingly, it will now be understood that the size or diameter of the stand 20 is sufficient to house the plurality of communications cables, wires, cords and bus bars 40. The has a diameter or width, depending upon the shape of the stand 20, which is variable depending upon the application and may range from about 0.5 inches (1.27 cm) to about 35 inches (88.9 cm). More particularly, the diameter or width of the stand may range from about 2 inches (5.08 cm) to about 6 inches (10.16 cm). The GFCI receptacle and/or circuit breaker 52 may have a switch 61 for cutting power to the circuit.

The rooftop power delivery device 10 further may comprise a GFCI circuit breaker with a standard weather protected receptacle or a weather protected GFCI receptacle. THE GFCI receptacle or circuit breaker 52 protects the entire circuit, including the cables, wires, cords and bus bars 40 and all equipment and systems connected to the circuit. A combination GFCI receptacle and GFCI circuit breaker 52 allows installers to obtain electrical power from the closest available circuit rather than from the closest source, which reduces installation costs in many cases. In cases where an Arc Fault Circuit Breaker (AFCI) protection is also called for, there are dual function GFCI/AFCI circuit breakers that can be employed in the invention.

Additionally, some codes require a minimum number of receptacles, disconnects or receptacles with disconnects, depending on the types of equipment and electrical systems installed on a roof. Therefore, rather than using fused switches and non-fused switches as a means of disconnect, a Molded Case Circuit Breaker (MCCB) and/or a Motor Starter Protector (MCP) 53, which provide faster and more precise protection to equipment and the circuits that supply them.

The thermostat 56 may be connected to the IOT. As used herein, "IOT" means "Internet of Things" and refers to a network of physical objects that feature an IP address for internet connectivity and the communication that occurs between these objects and other Internet-enabled devices and systems. In the present invention, the thermostat may comprise one or more Wi-Fi or hard-wired thermostats allowing remote monitoring and control of electrical equipment and systems and providing alerts via a computer, smartphone, SMS, tablet or other Internet enabled device.

Figure 6:
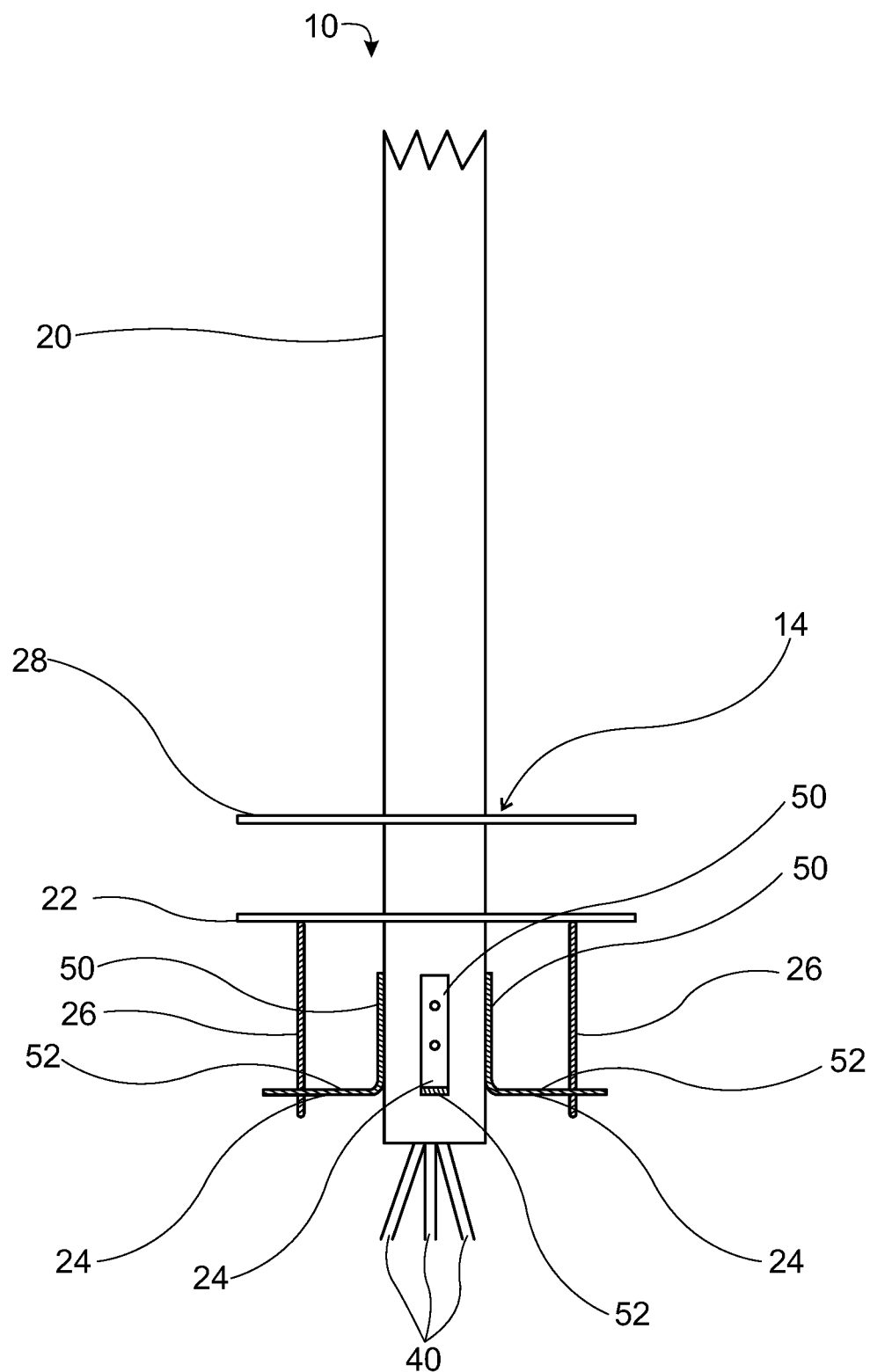
FIG. 6 shows a frontal view of an illustrative mounting assembly for the rooftop power delivery device of FIG. 1.

Turning now to FIG. 6, the mounting assembly 14 will be described. The mounting assembly 14 applies pressure from both the top and bottom surfaces of the roofing structure, thus minimizing the number of penetrations and the risk of leaks while providing a secure fit for the rooftop power delivery device 10. The mounting assembly 14 includes at least one stand 20, at least one cleat 22, a mounting assembly 14, and a vice assembly 18. The mounting assembly includes at least one stand 20, at least one cleat 22, and at least one flashing 28. As mentioned previously, the stand 20 may be part of the mounting assembly 14 or may be a component separate from the mounting assembly. The vice assembly 18 comprises one or more brackets 24 and securing means, such as traveler screws 26, for clamping the flashing 28 and the cleat 22 against the roof. The mounting assembly 14 and vice assembly 18 cooperate to minimize leaks due to penetrations through the roof while supplying sufficient pressure of at least 3 lb.-ft (4.07 N-m) from both the outer top surface and the interior bottom surface of the roof structure.

The components of the mounting assembly 14 and the vice assembly 18 may be comprised of metals, such as carbon steel, galvanized steel, stainless steel, aluminum, chrome, steel chrome-plated, steel with nickel/silicon carbide composite coating, brass, brass-chrome plated, brass with nickel/silicon carbide composite, stainless steel, stainless chrome-plated, stainless with nickel/silicon carbide composite coating, carbonitrided steel, nickel carbide plated steel, tempered steel, and non-metals, such as polycarbonate or polyvinylchloride. In one embodiment of the invention, the components of the mounting assembly 14 and the vice assembly 18 are comprised of carbon steel. The dimensions of the mounting assembly 14 are variable, depending in part on the size of the enclosure 12 and the application for which the rooftop power deliver system 10 is employed.

Figure 7:
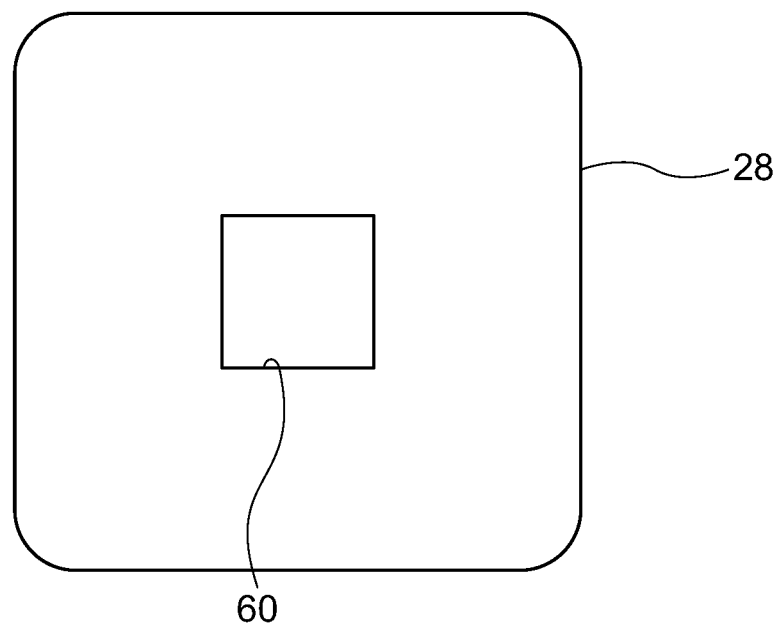
FIG. 7 shows a top plan view of a flashing component comprising the mounting assembly of FIG. 6.

The flashing 28 comprises a central aperture 60 that is sized and shaped to receive the stand 20, as illustrated in FIG. 7. The flashing 28 is secured to the stand 20 with a solid weld around the aperture 60 to create a water tight seal between the stand 12 and the flashing 28. The weld preferably meets American Welding Society (AWS) Section D (Structural Welding Code—Steel) 1.1 and 1.3. The flashing 28 also may be secured to the stand 20 via rivets, adhesive, such as epoxies, polyurethane and cyanoacrylate, studs, brazing, soldering, spot welding or nuts and bolts and combinations of the foregoing.

The flashing 28 may be any shape, but is substantially planar, and has a dimension that is variable depending upon the application and the size of the enclosure 12 and the stand 20. The length and width of the flashing 28 may range from about 4 inches (10.16 cm) to about 50 inches (127 cm), and more particularly from about 10 inches (25.4 cm) to about 20 inches (50.8) cm. In one embodiment of the invention, the flashing 28 forms a generally planar square, optionally with rounded corners, and is about 15.75 inches (40 cm) in both length and width. Being generally planar, the width of the flashing 28 is no more than about 1 inch (2.54 cm) or less in thickness or depth.

The rooftop power delivery device 10 is positioned with the flashing 28 on top of the roof on which the rooftop power delivery device 10 is to be installed. The stand 20 extends through a perforation created in the roof that is sized and shaped to receive the stand. To that end, the length of the stand 20 is dependent upon the total depth of the materials comprising the roof structure and is sufficient to enable roof penetration while supporting the enclosure 12 off the surface of the roof. The length of the stand 20 may vary from about 12 inches (30.48 cm) to about 100 inches (254 cm), and, more particularly, from about 24 inches (60.1 cm) to about 60 inches (152.4) inches, when accommodating an enclosure. The stand 20 has a diameter which ranges from about 2 inches (5.08 cm) to about 6 inches (15.24 cm).

The rooftop power delivery device 10 may further comprise one or more gussets 25 positioned above the flashing 28. As illustrated in FIG. 2, the one or more gussets 25 are generally triangular in shape and extend from the stand 20 above to the flashing 28 toward each corner of the flashing. To that end, the number of gussets 25 number four when the flashing 28 is square or rectangular in shape. The gussets 25 may be made from the same material as the stand 20 and/or the flashing 28 and welded thereto. The rooftop power delivery device 10 is designed to withstand wind forces up to 150 miles per hour, whether from tornado, hurricane or straight line winds, and the gussets 25 provide additional strength to the device further increasing its strength and rigidity.

Figure 8:
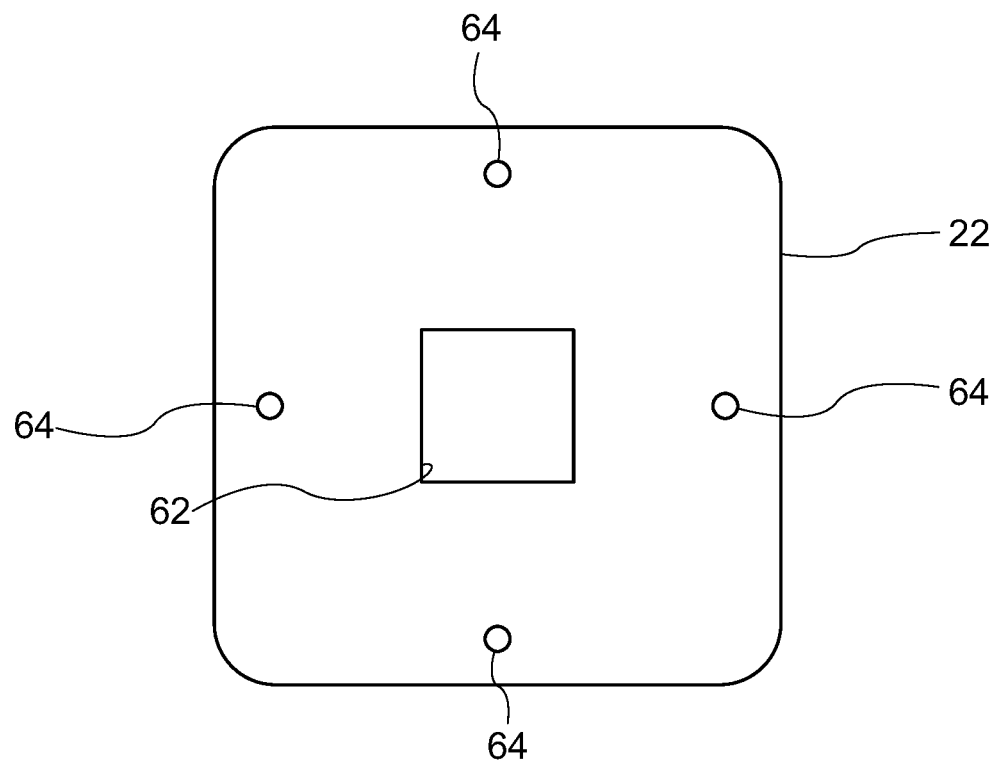
FIG. 8 shows a top plan view of a cleat component comprising the mounting assembly of FIG. 6.

The cleat 22 of the mounting assembly 14 forms a central aperture 62 through which the stand 20 is positioned, as shown in FIG. 8. The cleat 22 is positioned from the underside or interior of the roof, beneath the flashing 28 and at a sufficient distance from the flashing to accommodate the thickness of the roof. The length and width of the cleat 22 may range from about 4 inches (10.16 cm) to about 50 inches (127 cm), and more particularly from about 10 inches (25.4 cm) to about 20 inches (50.8) cm. In one embodiment of the invention, the cleat 22 forms a generally planar square, optionally with rounded corners, and is about 15.75 inches (40 cm) in both length and width. Being generally planar, the cleat 22 ranges from about 0.125 inches (0.3175 cm) to about 1 inch (2.54 cm) in thickness or depth.

The size and shape of both the cleat 22 and the flashing 28 may be identical, or they may differ. It is generally preferred that the size and shape of the cleat 22 and the flashing 28 be identical or similar to facilitate uniform application of pressure and the uniform distribution of force to the roof structure.

A vice assembly 18 clamps the flashing 28 and the cleat 22 against the roof. In some embodiments of the invention, the vice assembly may be considered a component of the mounting assembly 14. In one embodiment of the invention, the vice assembly 18 comprises brackets 24 that secure the cleat 22 to the stand 20.

Figure 9A:
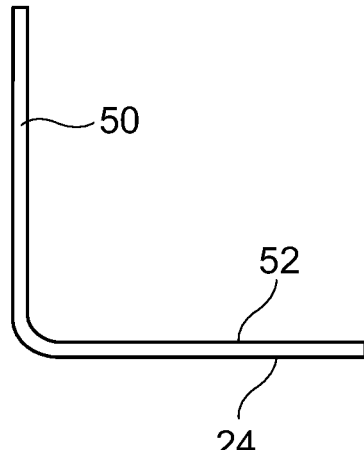
FIG. 9A illustrates a side view of an illustrative L-bracket used in the vice assembly of FIG. 6.
Figures 9B, 9C:
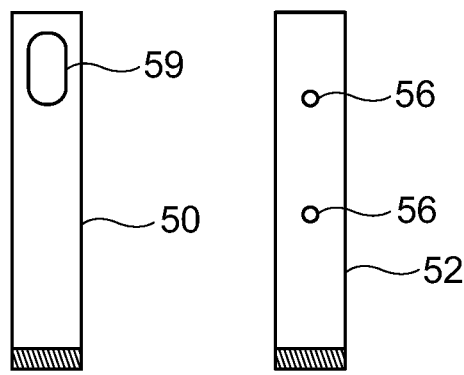
FIG. 9B illustrates a front view of the vertical component of the L-bracket shown in FIG. 6.
FIG. 9C illustrates a front view of the horizontal component of the L-bracket shown in FIG. 6.

The brackets 24 may comprise L-brackets, having a vertical portion 50 and a horizontal portion 52, as shown in FIGS. 9A, 9B and 9C, each of which has a length. The length of the vertical portion 50 and the length of the horizontal portion 52 of the L-bracket 24 may be substantially equal, or the length of the horizontal portion 52 may be greater than the length of the vertical portion. The length of the vertical portion of 50 preferably is not greater than the length of the horizontal portion 52, for a purpose yet to be described. The cleat 22 has a diameter and the length of the horizontal portion 52 is substantially equal to one-half of the diameter of the cleat 22 less the diameter of the stand 20. The horizontal portion 52 of the L-bracket 24 generally extends from the stand to the outer edge of the cleat 22. In one embodiment of the invention, the vertical portion 50 and the horizontal portion 52 of the L-bracket 24 are approximately equal and are about 5 inches (12.7 cm) in length.

The L-brackets 24 also have a width and a thickness which may vary with the particular application. The thickness of the L-brackets 24 ranges from about 0.125 inches (0.3175) to about 0.5 inches (1.27) and a width which ranges from about 1 inch (2.54 cm) to about 3 inches (7.62 cm). Increasing the width and/or thickness of the L-bracket 24 increases the strength of the vice assembly 18, without increasing the length of the horizontal portion 52 of the L-bracket.

Figure 10:
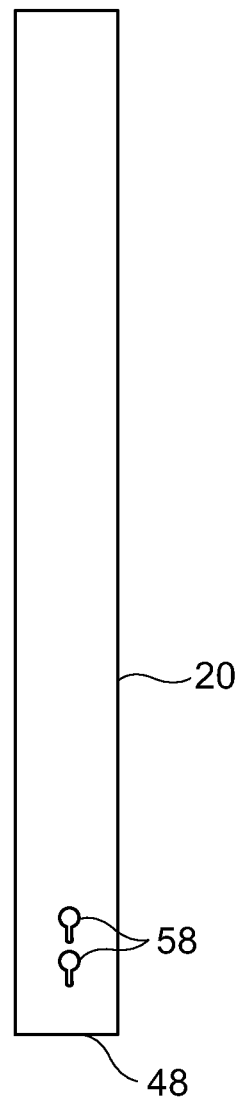
FIG. 10 shows a side, front or rear view of a stand comprising the rooftop power delivery device of FIG. 1.
Figure 11:
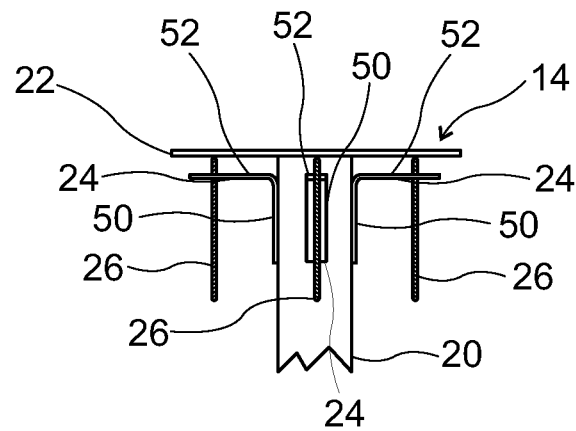
FIG. 11 illustrates the L-brackets positioned on the stand with the horizontal portion of the L-bracket positioned proximal the cleat.

The L-brackets 24 are secured to the stand 20 with bolts (not shown) via a plurality of apertures, such as key slots 58, shown in FIG. 10, formed in the stand that mate with apertures 59 formed in the vertical portion 50 of the L-bracket 24, as shown in FIG. 9B. It will be appreciated that the L-brackets 24 and the key slots 58 may be positioned on the stand 20 so that the horizontal portion 52 of the L-bracket is positioned distally, or away from, the cleat 22 near the lower end 48 of the stand 20, as shown in FIG. 6. Alternatively, the L-brackets 24 and the key slots 58 may be positioned on the stand 20 so that the horizontal portion 52 is positioned proximally the cleat 22, as shown in FIG. 11.

Figure 12:
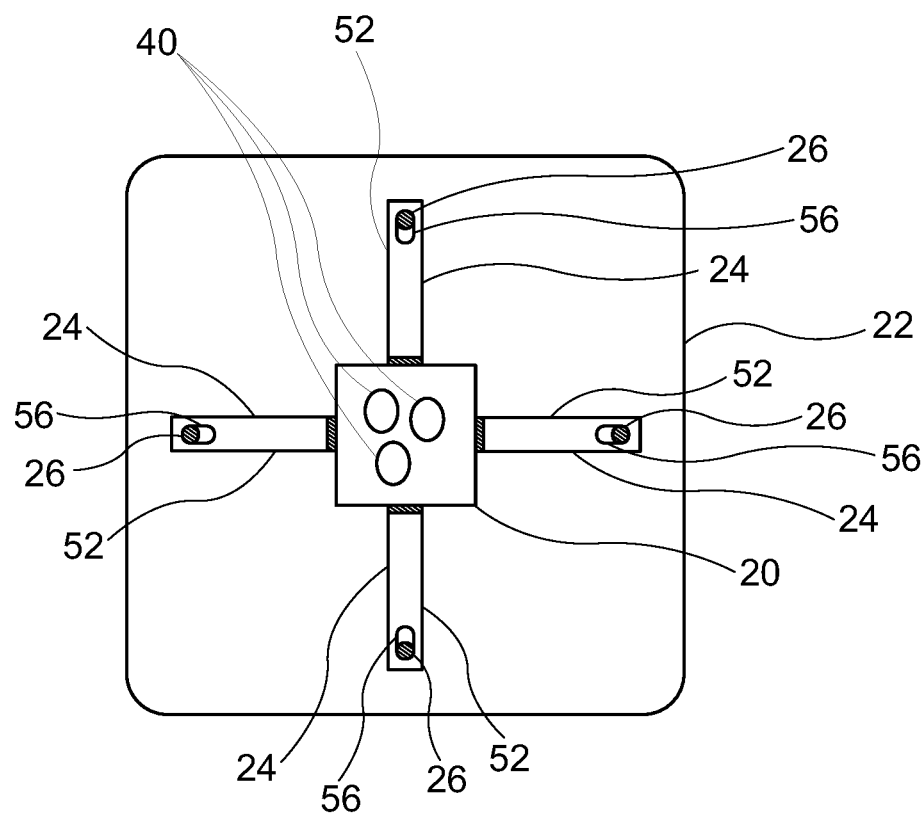
FIG. 12 shows a bottom view of the mounting assembly of FIG. 6.

The cleat 24 also forms lateral apertures 64 therethrough, shown in FIG. 8, which mate with apertures 56 formed in the horizontal portion 52 of each of the plurality of L-brackets 24 and through which traveling screws 26 are threaded to secure the L-brackets 24 to the cleat 22, as shown in FIG. 12. As the travelling screws 26 are tightened, the cleat 24 moves upward toward the inside surface of the roof structure on which the device 10 is to be installed. When the cleat 24 is pressed firmly against the inside of the roof, the travelling screws 26 will apply a downward pressure on the stand 20, which pulls the flashing 28 firmly against the top of the roof for a sturdier and drier fit. This allows the device 10 to grab the roof from the inside and outside of the building, providing a more stable fit and minimizing leaks. It now will be appreciated that an L-bracket 24 with a horizontal portion 52 having a length that is greater than or equal to the length of the vertical portion 50 enhances the power of the travelling screws 26 to apply a downward pressure on the 20 and pulls the flashing 28 against the top of the roof.

The rooftop power delivery device 10 preferably, although not necessarily, meets all NEC and Underwriter's Laboratories requirements, including UL508A, and all welds comply with AWS Section D (Structural Welding Code—Steel) 1.1 & 1.

The method of use and installation of the present invention now will be explained. The foregoing discussion of the invention is incorporated herein. A perforation is formed in a roof through which the stand 20 of the rooftop power delivery device 10 is dropped down the hole. The flashing 28, which remains above the roof on the exterior surface of the roof. The enclosure 12 is positioned directly off the roof, thus mitigating the deleterious effects of heat, humidity, corrosion, water intrusion and other elements and physical threats. The enclosure 12, stand 20 and flashing 28 are pre-assembled with the stand fitted through the central aperture 60 of the flashing, and inserted into the perforation in the roof as a unit.

From the underside, interior surface of the roof, the cleat 22 slides onto the stand 20 through the central aperture 62 at the bottom end 48 of the stand. The L-brackets 24 are inserted in key slots 58 on the stand 20 for ease of installation. The vertical portion 50 of the L-brackets 24 secure the cleat 22 to the stand 20 via bolts through apertures 59 in correspondence with key slots 58 in the stand.

The horizontal portion 52 of the L-bracket 24 abuts an underside of the cleat 22. Lateral apertures 64 in the cleat 22 mate with apertures 56 in the horizontal portion 52 of the L-bracket 24 via travelling screws 26 threaded therethrough. When the travelling screws 26 tightened, the cleat 22 is moved upward toward the inside of the roof. As the cleat 22 is pressed firmly against the inside of the roof, the travelling screws 26 apply a downward pressure on the stand 20, which pulls the flashing 28 firmly against the top of the roof. This allows the rooftop power delivery device 10 to grab the roof from both the inside and outside of the roof of the building, providing a superior, stable fit and minimizing leaks.

The stand 20 also forms an enclosed conduit, or raceway, for the transition of Communication cables, wires, cords and bus bars 40 from inside a building or structure to the enclosure 12 of the rooftop power delivery device 10. Electric power cords, ethernet cables, coaxial cables, conductor thermostat wires, and other communication cables, wires, cords and bus bars are threaded or fished through the stand 20 and wire into communication with their relative components housed in the enclosure 12.

It now will be appreciated that the subject invention comprises a rooftop power delivery device that supplies electric power from the inside of a building to equipment and systems installed on the outside of the building on a rooftop. The device comprises a white, powder coated enclosure, disconnects to provide protection for the circuitry and equipment to which power is delivered, a communications module, a mounting assembly and a vice assembly. The mounting assembly comprises a cleat that allows application of pressure from the outside of the rooftop and from the inside of the roof, providing a more secure and dryer fit. Flashing is welded to the stand that is installed on the rooftop. The stand extends through the roof through a perforation sized for the application, depending on the equipment being installed, with a matching cleat installed on the stand from the inside.

The invention has been described above both generically and with regard to specific embodiments. Although the invention has been set forth in what has been believed to be preferred embodiments, a wide variety of alternatives known to those of skill in the art can be selected with a generic disclosure. Changes may be made in the combination and arrangement of the various parts, elements, steps and procedures described herein without departing from the spirit and scope of the invention as defined in the following claims.

I claim:

1. A rooftop delivery device for supplying electric power, plumbing and lines to equipment and systems positioned on a roof, the rooftop delivery device comprising:
   a mounting assembly, comprising:
      a flashing positioned above the roof;
      a cleat positioned below the roof;
   a vice assembly for clamping the flashing and the cleat against the roof, wherein the vice assembly comprises at least one bracket for securing the cleat to the stand and a plurality of traveling screws for securing the cleat to the bracket.

2. The rooftop delivery device of claim 1 further comprising a stand for connecting the flashing and the cleat.

3. The rooftop delivery device of claim 1 wherein:
   the cleat comprises a plurality of lateral apertures;
   the at least one bracket comprises an L-bracket having a vertical portion that is secured to the stand and a horizontal portion forming apertures through which the traveling screws are threaded to secure the cleat to the horizontal portion of the cleat; and
   wherein, when the traveling screws are threaded through the apertures in the horizontal portion, the cleat is moved toward an interior surface of the roof and applies pressure thereto.

4. The rooftop delivery device of claim 3 wherein, as the cleat is pressed against the interior surface of the roof, the travelling screws apply a downward pressure on the stand, which pulls the flashing firmly against the top of the roof.

5. The rooftop delivery device of claim 2 further comprising an enclosure for housing electronic components.

6. The rooftop delivery device of claim 3 wherein the vertical portion and the horizontal portion of the L-bracket each has a length and wherein the length of the horizontal portion is greater than or equal to the length of the horizontal portion.

7. The rooftop delivery device of claim 5 wherein the mounting assembly, the vice assembly, the stand and the enclosure are comprised of materials selected from the group consisting of carbon steel, galvanized steel, stainless steel, aluminum, chrome, steel chrome-plated, steel with nickel/silicon carbide composite coating, brass, brass-chrome plated, brass with nickel/silicon carbide composite, stainless steel, stainless chrome-plated, stainless with nickel/silicon carbide composite coating, carbonitrided steel, nickel carbide plated steel, tempered steel.

8. The rooftop delivery device of claim 6 wherein the cleat has an outer edge and wherein the horizontal portion of the L-bracket extends to the outer edge of the cleat.

9. The rooftop delivery device of claim 3 further comprising at least one gusset positioned above the flashing between the stand and the flashing.

10. A method of installing a rooftop delivery device on a roof structure having an exterior surface and an interior surface for the delivery of electric power, plumbing and lines to equipment and system on the roof, the method comprising the steps of:
   providing a flashing on the exterior surface of the roof structure;
   providing a cleat beneath the interior surface of the roof structure;
   providing a vice assembly comprising at least one bracket for securing the cleat to the stand and a plurality of traveling screws for securing the cleat to the bracket; and
   moving the cleat toward the interior surface of the roof structure via the traveling screws and clamping the flashing against the exterior surface of the roof and the cleat against the interior surface of the roof.

11. The method of claim 10 further comprising the steps of perforating the roof through the exterior surface and the interior surface.

12. The method of claim 11 further comprising the steps of:
   securing the flashing to a stand; and
   inserting the stand in the perforation in the roof so that the flashing remains in contact with the exterior surface of the roof.

13. The method of claim 12 further comprising the step of applying downward pressure on the stand and pulling the flashing firmly against the top of the roof.

14. The method of claim 12 further comprising the step of providing an enclosure on the stand proximal the exterior surface of the roof, the enclosure comprising electrical components or plumbing components for the operation and monitoring electrical equipment and systems on the roof.

15. The method of claim 14 further comprising the step of supplying cables, wires, cords, lines, tubing, conduit, pipes and/or bus bars through the stand and providing power to the components in the enclosure and the equipment and systems on the roof.

* * * * *